(12) United States Patent
Yasunaga

(10) Patent No.: US 10,552,686 B2
(45) Date of Patent: Feb. 4, 2020

(54) OBJECT RECOGNITION DEVICE THAT DETERMINES OVERLAPPING STATES FOR A PLURALITY OF OBJECTS

(71) Applicant: TOSHIBA TEC KABUSHIKI KAISHA, Tokyo (JP)

(72) Inventor: Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 15/816,579

(22) Filed: Nov. 17, 2017

(65) Prior Publication Data

US 2018/0150699 A1 May 31, 2018

(30) Foreign Application Priority Data

Nov. 25, 2016 (JP) ................................ 2016-228951

(51) Int. Cl.
*G06K 9/00* (2006.01)
*G06Q 20/20* (2012.01)
(Continued)

(52) U.S. Cl.
CPC ..... *G06K 9/00771* (2013.01); *G06K 9/00208* (2013.01); *G06K 9/46* (2013.01);
(Continued)

(58) Field of Classification Search
CPC .......... G06K 9/00201; G06K 9/00208; G06K 9/00671; G06K 9/00771; G06K 9/209; G06K 9/3233; G06K 9/34; G06K 9/342; G06K 9/46; G06K 9/4604; G06K 9/4638; G06K 9/723; G06T 7/10; G06T 7/11; G06T 7/12; G06T 7/50; G06T 7/70; G06T 7/73;
(Continued)

(56) References Cited

U.S. PATENT DOCUMENTS 7,949,568 B2 * 5/2011 Fano ........................ G06K 9/00
382/181
8,594,425 B2 * 11/2013 Gurman ............. G06K 9/00201
382/173
(Continued)

*Primary Examiner* — Eric Rush
(74) *Attorney, Agent, or Firm* — Kim & Stewart LLP

(57) ABSTRACT

An object recognition device according to an embodiment includes a camera that captures an image of an imaging area. A storage device stores, for each of a plurality of registered objects, dictionary feature information for identifying the corresponding object and dictionary boundary information for identifying an actual boundary area of the corresponding object. A processor receives the captured image from the camera, and determines an object area in the captured image. The processor extracts feature information from the object area, and, based on the extracted feature information compared to the dictionary feature information, identifies each object included in the object area. The processor also extracts boundary information corresponding to each identified object included in the object area, and, based on the extracted boundary information compared to the dictionary boundary information with respect to each identified object, determines an overlap state of each identified object in the object area.

20 Claims, 12 Drawing Sheets

(51) Int. Cl.

| | | |
|---|---|---|
| *G06T 7/50* | (2017.01) | |
| *G06K 9/46* | (2006.01) | |
| *G06T 7/11* | (2017.01) | |
| *G07G 1/00* | (2006.01) | |
| *G06T 7/12* | (2017.01) | |
| *G06T 7/73* | (2017.01) | |
| *G06K 9/72* | (2006.01) | |
| *G06K 9/34* | (2006.01) | |

(52) U.S. Cl.
CPC .......... *G06K 9/4638* (2013.01); *G06K 9/723* (2013.01); *G06Q 20/203* (2013.01); *G06Q 20/208* (2013.01); *G06T 7/11* (2017.01); *G06T 7/12* (2017.01); *G06T 7/50* (2017.01); *G06T 7/75* (2017.01); *G07G 1/0054* (2013.01); *G07G 1/0063* (2013.01); *G06K 9/34* (2013.01); *G06K 9/4604* (2013.01); *G06T 2207/10004* (2013.01); *G06T 2207/30242* (2013.01)

(58) Field of Classification Search
CPC ... G06T 7/74; G06T 7/75; G06T 2207/10004; G06T 2207/10028; G06T 2207/30108; G06T 2207/30112; G06T 2207/30242; G06Q 10/08; G06Q 10/087; G06Q 20/20; G06Q 20/203; G06Q 20/208; G06Q 30/00; G07G 1/0054; G07G 1/0063
USPC ....... 382/100, 101, 106, 141, 143, 152–154, 382/173, 181, 199, 203, 286, 291; 705/16, 22, 23, 28, 29
See application file for complete search history.

(56) References Cited

U.S. PATENT DOCUMENTS

| | | | |
|---|---|---|---|
| 9,025,816 B2* | 5/2015 | Naito ................... | G06K 9/4652 382/103 |
| 9,367,770 B2* | 6/2016 | Footen .................... | G06K 9/78 |
| 10,019,833 B2* | 7/2018 | Li ........................... | G06T 19/00 |
| 10,169,660 B1* | 1/2019 | Ren ..................... | G06K 9/00771 |
| 2005/0105766 A1* | 5/2005 | Fesquet .................... | G06K 9/20 382/101 |
| 2010/0158310 A1* | 6/2010 | McQueen ................ | G06K 9/00 382/100 |
| 2016/0180191 A1 | 6/2016 | Nobuoka et al. | |

\* cited by examiner

OBJECT RECOGNITION DEVICE THAT DETERMINES OVERLAPPING STATES FOR A PLURALITY OF OBJECTS

CROSS-REFERENCE TO RELATED APPLICATION

This application is based upon and claims the benefit of priority from Japanese Patent Application No. 2016-228951, filed Nov. 25, 2016, the entire contents of which are incorporated herein by reference.

FIELD

Embodiments described herein relate to an object recognition device.

BACKGROUND

An object recognition device that identifies a plurality of items (e.g., target objects) from a captured image has been known. The object recognition device performs a process of specifying an object image area from a captured image, which is obtained by imaging an area in which an object is disposed, and specifying the object in the specified object image area. However, if a plurality of objects are positioned while overlapping with each other, it is difficult for the object recognition device to identify individual objects and the positions thereof with high accuracy.

DETAILED DESCRIPTION

In order to solve the above-described problem, an object recognition device that is able to determine the state of a plurality of objects to be recognized is provided.

An object recognition device according to an embodiment includes a camera that captures an image of an imaging area including an object position area. A storage device stores, for each of a plurality of registered objects, dictionary feature information for identifying the corresponding object and dictionary boundary information for identifying an actual boundary area of the corresponding object. A processor receives the captured image from the camera, and determines an object area in the captured image. The processor extracts feature information from the object area, and, based on the extracted feature information compared to the dictionary feature information, identifies each object included in the object area. The processor also extracts boundary information corresponding to each identified object included in the object area, and, based on the extracted boundary information compared to the dictionary boundary information with respect to each identified object, determines an overlap state of each identified object relative to additional objects in the object area. Based on the determined overlap state, the processor determines whether two or more identified objects in the object area are portions of the same object. A settlement processing is performed for a transaction with respect to each identified object, the two or more identified objects that are determined to be portions of the same object being treated as a single identified object in the transaction.

Hereinafter, embodiments will be described with reference to drawings.

First Embodiment

First, a configuration of an object recognition system 1 that includes an object recognition device 6 according to a first embodiment will be described.

Figure 1:
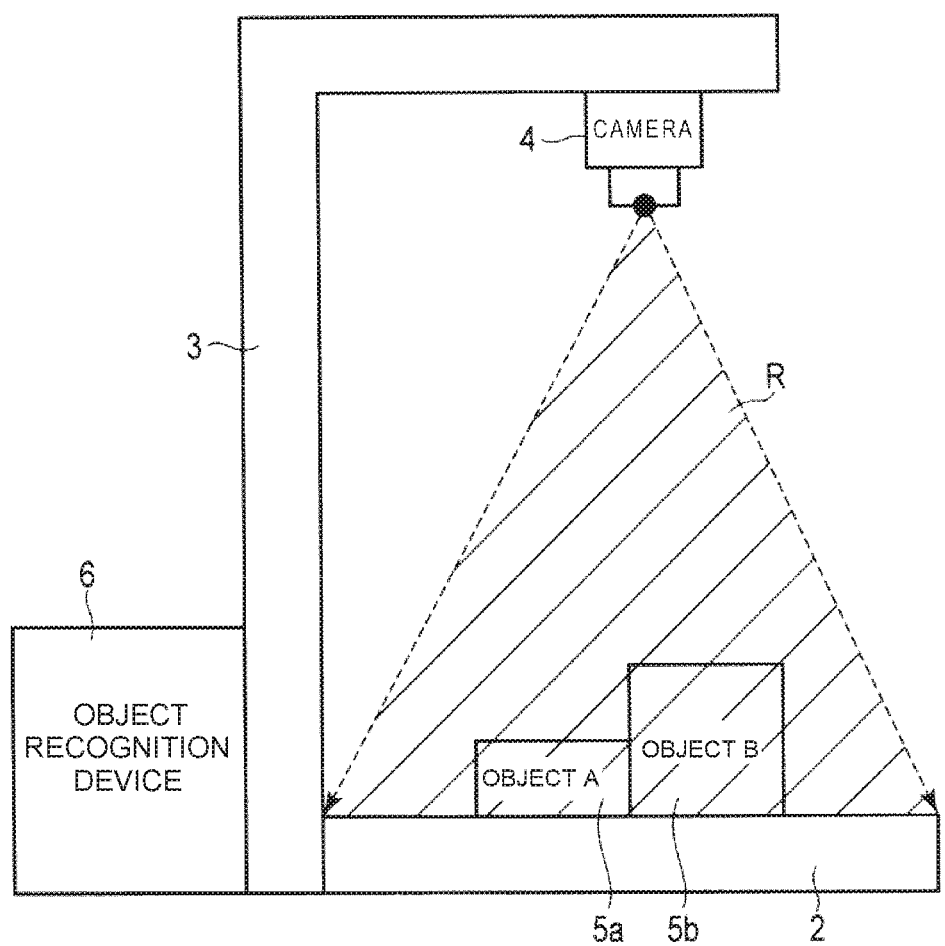
FIG. 1 is a schematic view illustrating an example configuration of an object recognition system that includes an object recognition device according to a first embodiment.
Figure 2:
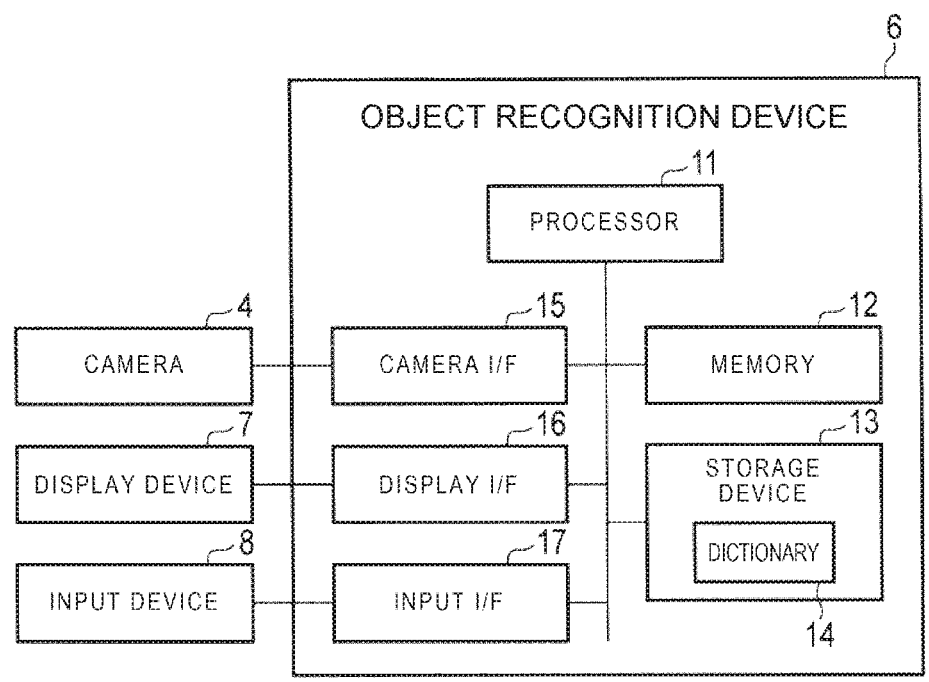
FIG. 2 is a block diagram illustrating an example configuration of the object recognition device.

FIG. 1 is a schematic view illustrating an example configuration of the object recognition system 1 that includes the object recognition device 6 according to the first embodiment. In addition, FIG. 2 is a block diagram illustrating an example configuration of the object recognition device 6 according to the first embodiment.

As illustrated in FIG. 1, the object recognition system 1 includes a table 2, a frame 3, a camera 4, and the object recognition device 6. The object recognition system 1 is a system in which the object recognition device 6 recognizes individual objects included in an image that is captured by the camera 4. In addition, as illustrated in FIG. 2, the object recognition system 1 includes a display device 7 and an input device 8 that are connected to the object recognition device 6. The object recognition system 1 may include a settlement device that performs a settlement process with respect to an object recognized by the object recognition device 6. If the object recognition system 1 includes the settlement device, the object recognition system 1 may also perform a function of calculating a charge for an object and a function of performing a settlement process with respect to a payment for the object. In addition, the object recognition system 1 may include a counting device which calculates the total number of objects recognized by the object recognition device 6 or an inspection device which inspects the objects.

The table 2 includes a surface on which objects 5a and 5b to be recognized are placed. The objects, which are recognition targets, are positioned on an object position area on the surface of the table 2. The table 2 may have any configuration as long as the plurality of objects, which are recognition targets, are positioned in an imaging range of the camera 4. A predetermined pattern (a solid black color, for example) may be applied to the surface of the table 2 on which the objects are placed. In addition, a basket holding a plurality of objects to be recognized may be placed on the table 2. In addition, the table 2 may be provided with a belt conveyor which transports a plurality of objects placed thereon.

The frame 3 is a supporting member that supports the camera 4. The frame 3 is configured such that the camera 4 can be attached to a portion of the frame 3 that faces the surface of the table 2 on which the objects are placed.

The camera 4 is an imaging device that captures an image from which the objects are recognized. For example, the camera 4 includes an imaging element such as a charge-coupled device (CCD) image sensor or a complementary metal-oxide semiconductor (CMOS) image sensor and a lens through which light forms an image on the imaging element. The camera 4 may be configured to capture images at non-visible wavelengths. For example, the camera 4 may be an infrared camera.

The camera 4 is attached to the frame 3 such that the imaging optical axis of the lens faces the table 2. The camera 4 is set such that the object position area on the table 2 is included in an imaging area. The camera 4 captures an image that includes images of upper surfaces of the objects 5a and 5b disposed in the object position area on the table 2. The camera 4 supplies the captured image to the object recognition device 6. The camera 4 may capture an image in accordance with a control signal from the object recognition device 6.

The object recognition device 6 performs an object recognition process with respect to an image that is captured by the camera 4. The object recognition device 6 performs a recognition process which will be described later. In the example illustrated in FIG. 2, the object recognition device 6 includes a processor 11, a memory 12, a storage device 13, a camera I/F 15, a display I/F 16, and an input I/F 17. The processor 11, the memory 12, the storage device 13, the camera I/F 15, the display I/F 16, and the input I/F 17 are connected to each other via a bus such that the processor 11, the memory 12, the storage device 13, the camera I/F 15, the display I/F 16, and the input I/F 17 can communicate with each other.

The processor 11 performs various computing processes. The processor 11 may be a CPU, for example. The processor 11 realizes various processing functions by executing programs stored in the memory 12 or the storage device 13. For example, the processor 11 executes various programs to function as: a feature extraction unit, a boundary extraction unit, a dictionary registration unit, an object specifying unit, a boundary estimation unit, or a state determination unit. The feature extraction unit has a function of extracting feature information for specifying an object from an image. The boundary extraction unit extracts boundary information for identifying the boundary of an object from an image. The dictionary registration unit has a function of registering dictionary information including feature information and boundary information in a dictionary. The object specifying unit has a function of specifying an object using feature information extracted from the image and feature information in a dictionary. The boundary estimation unit has a function of estimating the entire area of individual objects. The state determination unit has a function of determining the state of each object.

The memory 12 is used by the processor 11 to perform a process. For example, the memory 12 includes a ROM and a RAM. The ROM of the memory 12 is a read-only nonvolatile memory. The ROM stores a program corresponding to the specifications of the object recognition system 1 and control data that is used in the program. In addition, the RAM of the memory 12 is a volatile memory that functions as a working memory. The RAM stores a program executed by the processor 11 or data being currently processed.

The storage device 13 is a rewritable nonvolatile storage device. The storage device 13 is a large-capacity storage device such as a hard disk drive (HDD) or a solid state drive (SSD). In addition, the storage device 13 may include a memory I/F such as a card slot into which a recording medium such as a memory card can be inserted. The storage device 13 includes a dictionary (a database) 14 in which the dictionary information for recognition is stored. In addition, the storage device 13 may store a program executed by the processor 11, control data, or the like.

The dictionary 14 need not be provided in the object recognition device 6 as long as the processor 11 can access the dictionary 14. For example, the dictionary 14 may be provided in an external device with which the processor 11 can communicate and to which the processor 11 can be connected.

The camera interface (I/F) 15 communicates with the camera 4. The camera I/F 15 relays data input and output between the processor 11 and the camera 4. For example, the camera 4 supplies a captured image to the processor 11 via the camera I/F 15.

The display interface (I/F) 16 is connected to the display device 7. The display I/F 16 relays data input and output between the processor 11 and the display device 7. The display device 7 displays a screen based on display control information that is supplied from the processor 11 via the display I/F 16. The display device 7 includes a display panel and a drive circuit that causes the display panel to display a screen. The display panel may be a display device such as a liquid crystal display or an organic EL display.

The input interface (I/F) 17 is connected to the input device 8. The input I/F 17 relays data input and output between the processor 11 and the input device 8. The input device 8 supplies information that a user inputs using the operation member to the processor 11 via the input I/F 17. Examples of the input device 8 include a touch sensor, a keyboard, and a ten-key pad. The touch sensor is, for example, a resistance film type touch sensor or a capacitance type touch sensor. The touch sensor may be configured as a touch screen integrated with the display panel of the display device 7.

Next, a dictionary registration process in the object recognition device 6 according to the first embodiment, in which dictionary information for recognition is registered in the dictionary, will be described.

Figure 3:
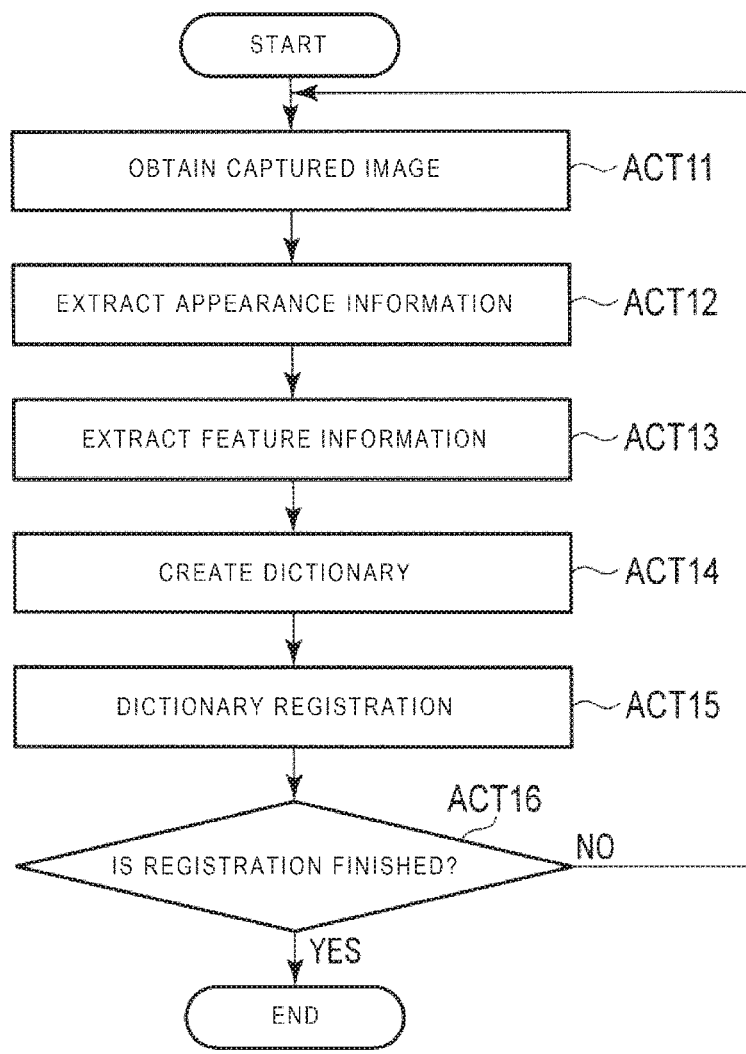
FIG. 3 is a flowchart illustrating an example sequence of operations for a dictionary registration process.

FIG. 3 is a flowchart illustrating an example sequence of operations for the dictionary registration process that is performed by the object recognition device 6 according to the first embodiment.

For example, an operator issues an instruction to set a dictionary registration mode as an operation mode by using the input device 8. Furthermore, the operator places a single object to be registered within the object position area on the table 2 and issues an instruction to start the dictionary registration process. When the instruction to start the dictionary registration process is issued, the processor 11 instructs the camera 4 to capture an image. The camera 4 captures an image of the imaging area including an area on the table 2 on which the object is placed based on the instruction from the object recognition device 6. The camera 4 supplies the captured image to the object recognition device 6.

After the camera 4 captures an image, the object recognition device 6 receives the captured image from the camera 4 using the camera I/F 15 (ACT 11). When the captured image from the camera 4 is received, the processor 11 extracts boundary information for specifying the boundary of the object from the captured image (ACT 12). The boundary information is information for estimating the entire area of the object. The boundary information is information that indicates at least a portion of a contour such as end points or the shape of the contour.

In addition, the processor 11 extracts feature information for specifying the object by using image information in the boundary information from the captured image (ACT 13). The feature information is matching information for recognizing (specifying) the object. For example, the feature information indicates a feature value that can be extracted from an image of the object such as feature point information and a local feature value. The local feature value is extracted using a method such as SIFT or the like.

In addition, each of the feature information and the boundary information (such as endpoints or a contour) includes information indicating a positional dependence relationship (that is, relative position information). The relative position information is information for coping with an increase or reduction in size of the captured image of the object which occurs due to a change in relative positions of the camera 4 and the object.

When the feature information and the boundary information of the object are extracted from the captured image, the processor 11 creates dictionary information in which the extracted feature information and the extracted boundary information are correlated with information indicating the type of the object or the like (ACT 14). The created dictionary information is information for recognition with respect to a surface of a registration target object that is imaged by the camera 4. When the dictionary information with respect to the surface imaged by the camera 4 is created, the processor 11 registers the created dictionary information in the dictionary 14 (ACT 15).

Figure 4:
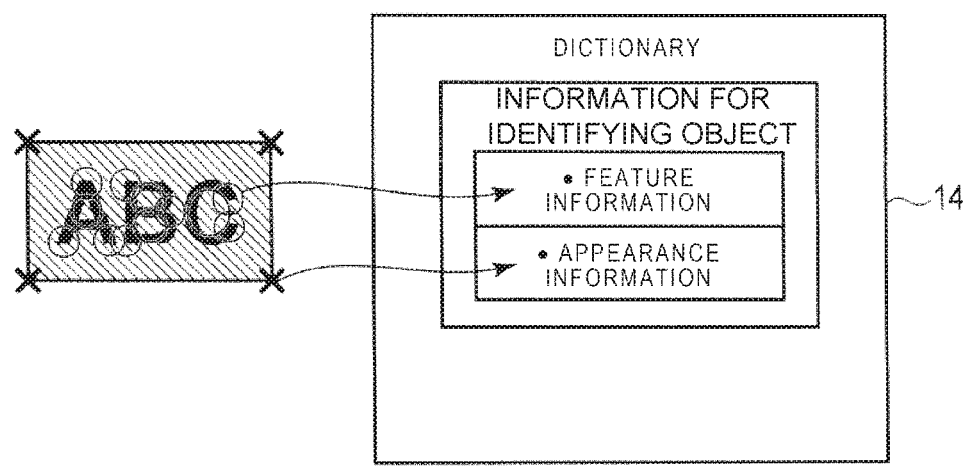
FIG. 4 is a diagram schematically illustrating information to be registered in a dictionary.

FIG. 4 is a diagram schematically illustrating an example of the feature information and the boundary information to be registered in the dictionary 14.

The X marks on a captured image of an object as illustrated in FIG. 4 denote end points, which are examples of the boundary information. In addition, circle marks on the captured image of the object as illustrated in FIG. 4 denote areas including feature points, and the local feature value is calculated for each feature points. If the image of the object as illustrated in FIG. 4 is captured, the processor 11 registers the boundary information indicating each end point and feature value information indicating the feature points and the local feature values in the dictionary 14, as illustrated in FIG. 4.

The following description will be made based on an assumption that the dictionary registration process described in the first embodiment is performed when the image is captured in a state where a single object is disposed in the object position area on the table 2. Accordingly, an image of one object is included in the image that the camera 4 captures in the registration process. Therefore, the processor 11 can extract an image of the single object from the captured image in the dictionary registration process. As a result, the processor 11 can extract boundary information for specifying the boundary of the entire object such as end points or a contour from the image of the single object and can register the extracted boundary information in the dictionary.

In addition, in an example illustrated in FIG. 4, the feature information of the object is a plurality of items of feature point information (the feature points and the local feature values) present in an image of a surface of the object that is imaged. With such feature information, the processor 11 can identify an object from an image that includes at least a portion of the object, in a process for identifying an object from a captured image. In addition, when referring to boundary information in a dictionary with respect to the specified object, the processor 11 can estimate the area of the entire object using information such end points or a contour that is extracted from the captured image.

Processes in ACT 11 to ACT 15 are performed for each surface of an object to be registered. That is, when the registration of the dictionary information in ACT 15 is finished, the processor 11 determines whether to finish the dictionary registration process or not (ACT 16). For example, the object recognition device 6 may determine whether to finish or continue the dictionary registration based on an instruction to finish the registration from the operator or an instruction to perform the dictionary registration with respect to another surface. If an instruction to register another surface is issued through the input device 8 (NO in ACT 16), the processor 11 returns to ACT 11 and the processor 11 performs the processes in ACT 11 to ACT 15 again. In this case, the operator may issue an instruction to restart the dictionary registration after changing a surface of the object that faces the camera 4. In addition, if there is an instruction to finish the registration that is issued through the input device 8 (YES in ACT 16), the processor 11 finishes the dictionary registration process.

Via the above-described processes, dictionary information for recognition (i.e., information for specifying an object), which is dictionary information including the feature information and the boundary information of the object, is registered in the dictionary 14 of the storage device 13.

Next, the object recognition process in the object recognition device 6 according to the first embodiment will be described.

Figure 5:
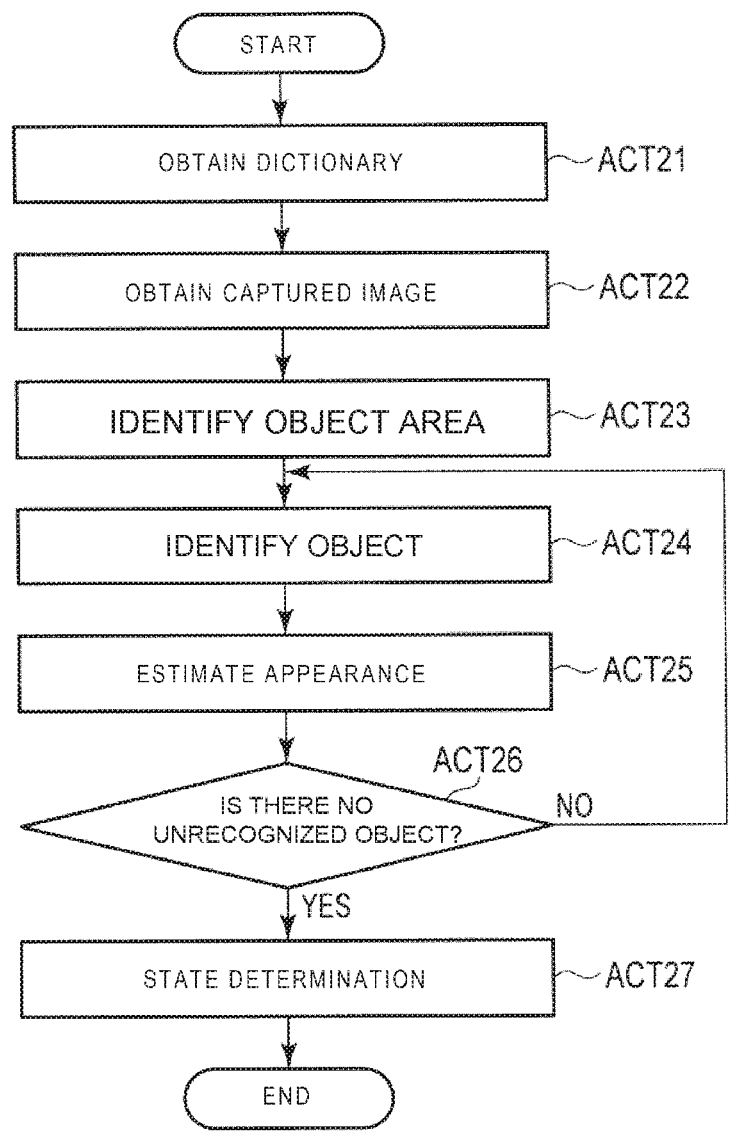
FIG. 5 is a flowchart illustrating an example sequence of operations for an object recognition process.
Figure 6:
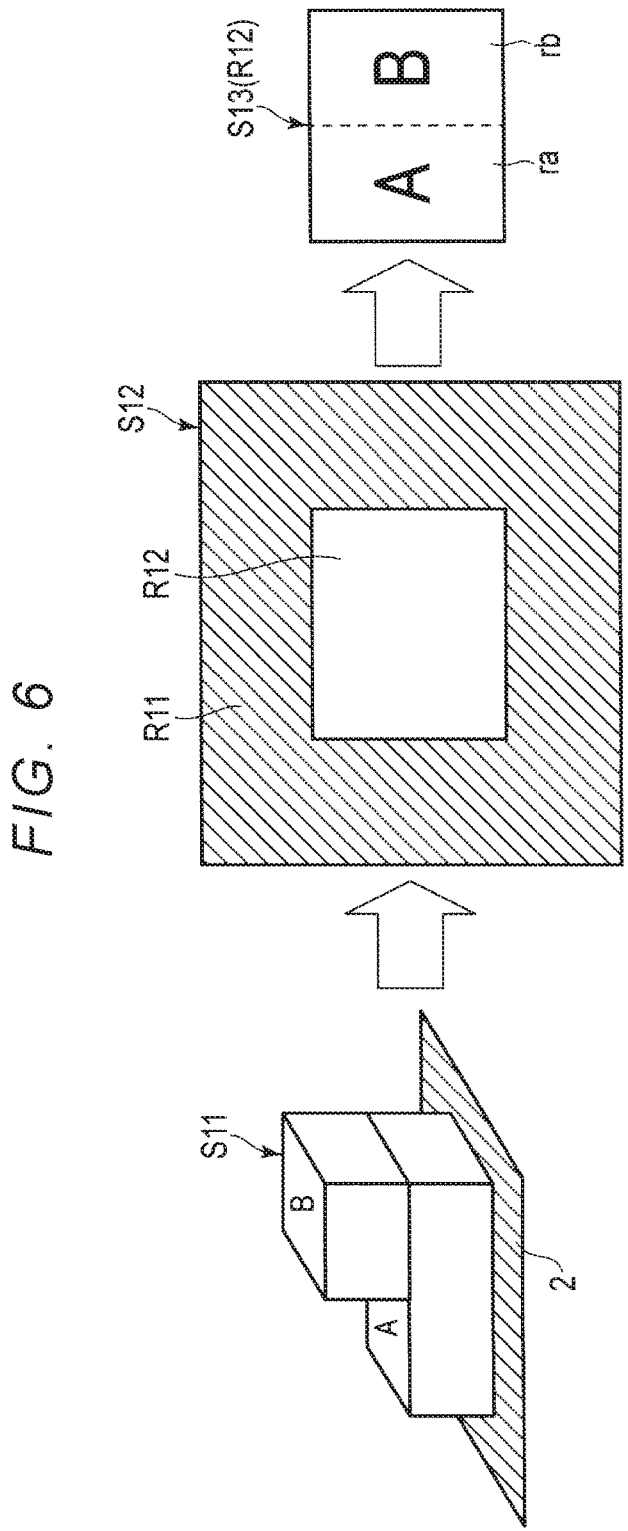
FIG. 6 is a diagram illustrating an example of an arrangement of objects to be recognized, an example of a captured image, and an example of an object area.

FIG. 5 is a flowchart illustrating an example sequence of operations for the object recognition process performed by the object recognition device 6 according to the first embodiment. In addition, FIG. 6 is a diagram illustrating an example of an arrangement S11 of a plurality of objects, an example of a captured image S12, and an example of an object area S13. Hereinafter, the flow of the object recognition process illustrated in FIG. 5 will be described with reference to a specific example illustrated in FIG. 6.

The operator issues an instruction to set a recognition process mode as the operation mode by using the input device 8 and places objects to be recognized within the object position area on the table 2. Here, the description will be made assuming that a plurality of objects is placed within the object position area on the table 2.

For example, after placing the objects, the operator issues an instruction to start the object recognition process by using the input device 8. Alternatively, the object recognition process may be started when it is detected that the objects are placed. When the instruction to start the object recognition process is issued, the processor 11 instructs the camera 4 to capture an image. The camera 4 captures an image of the imaging area including an object-placed area according to the instruction from the object recognition device 6. The camera 4 provides the captured image to the object recognition device 6.

The processor 11 of the object recognition device 6 receives an instruction to start the object recognition process, accesses the dictionary 14 for recognition (ACT 21), and receives the captured image from the camera 4. When the camera 4 outputs the captured image, the processor 11 of the object recognition device 6 obtains the captured image from the camera 4 via the camera I/F 15 (ACT 22). When the captured image from the camera 4 is obtained, the processor 11 extracts an object area in the captured image (ACT 23).

For example, the processor 11 distinguishes the area of the objects (the object area) and the area other than the object area (a non-object area) by using a difference between a background image and the captured image (a background difference method). Alternatively, the processor 11 may distinguish the object area and the non-object area using a method other than the background difference method. For example, as illustrated in FIG. 6, when the objects in the arrangement state S11 are imaged, the captured image S12 is obtained. A hatched portion of the captured image S12 illustrated in FIG. 6 is a background area R11. A portion other than the background area R11 is a foreground area (the object image area) R12. When the difference between the captured image S12 and the background image which is obtained by imaging the background only is calculated, an image S13 of the object area as illustrated in FIG. 6 is obtained.

When the object area is extracted, the processor 11 performs an object identification process of identifying individual objects included in the object area (ACT 24). For example, when feature information is extracted from the left side of the image S13 of the object area, the processor 11 identifies an object A by using the feature information that is obtained from an image area "ra" on the left side of the image S13. In addition, when feature information is extracted from the right side of the image S13 of the object area, the processor 11 specifies an object B by using the feature information that is obtained from an image area "rb" on the right side of the image S13.

When one object is identified, the processor 11 extracts at least a portion of boundary information such as end points from the object image area of the identified object in the captured image. The processor 11 identifies an estimated object area by estimating the boundary of the object by using boundary information in the dictionary 14 with respect to the identified object and boundary information extracted from the captured image (ACT 25). The estimated object area is an area estimated as a boundary area of the entire object in the captured image. If the entire object (the entire boundary area) is imaged, the estimated object area coincides with the actual image of the object. On the other hand, if only a portion of the object is imaged (e.g., if a portion of the object is hidden by another object), an image of the other object is included in the estimated object area. In the example illustrated in FIG. 6, the estimated object area for the object B coincides with the image area "rb" of the object B. However, the estimated object area for the object A in the example illustrated in FIG. 6 includes the image area "ra" of the object A and the image area "rb" of the object B.

When the estimated object area for an object is determined, the processor 11 determines whether an unrecognized object is present or not in the captured image (ACT 26). For example, the processor 11 determines whether the unrecognized object is present or not by determining whether the captured image includes an area in which there is no identified object. If it is determined that the unrecognized object is present (NO in ACT 26), the processor 11 returns to ACT 24 and the processor 11 performs another object identifying process.

In addition, if it is determined that the unrecognized object is not present (YES in ACT 26), the processor 11 performs a state determination process of determining the state of each of specified objects (ACT 27). For example, the processor 11 determines an overlapping state of each object as the state determination process. If the estimated object area coincides with an image of the identified object in the captured image, the processor 11 determines that the object is not in an overlapped state. In addition, if the estimated object area does not coincide with the image of the identified object in the captured image, the processor 11 determines that the object is overlapped by another object. For example, in the example illustrated in FIG. 6, the processor 11 determines that the object B is not in an overlapped state and the object A is overlapped by the object B.

In addition, in the state determination process, the processor 11 performs a sameness determination process of determining whether two image areas identified as the same types of objects are areas of the same object. For example, the processor 11 determines whether one object determined as being overlapped by another object is specified as two objects as the sameness determination process. In addition, the processor 11 may perform the sameness determination process if a plurality of same types of objects is present. In this case, when a plurality of estimated object areas for a plurality of objects specified as the same types of objects overlap each other, the processor 11 may determine that the objects are the same object.

In this manner, the processor 11 finishes the object recognition process while using the result of the process of identifying the objects from the captured image and the result of the state determination process for each of the identified objects as the result of the object recognition process.

The object recognition device according to the above-described first embodiment not only specifies a plurality of objects from a captured image but also detects the overlapping state of each object in the captured image. That is, the object recognition device according to the first embodiment can identify an object with high accuracy by detecting the overlapping state of the object. For example, the object recognition device according to the first embodiment detects the overlapping state of objects so that object recognition failure can be prevented and it is possible to confirm whether there is a hollow space below an upper object which another small object can be positioned within, the hollow space being formed by the objects overlapping each other.

Second Embodiment

Next, a configuration of an object recognition system 1' that includes an object recognition device 6' according to a second embodiment will be described.

Figure 7:
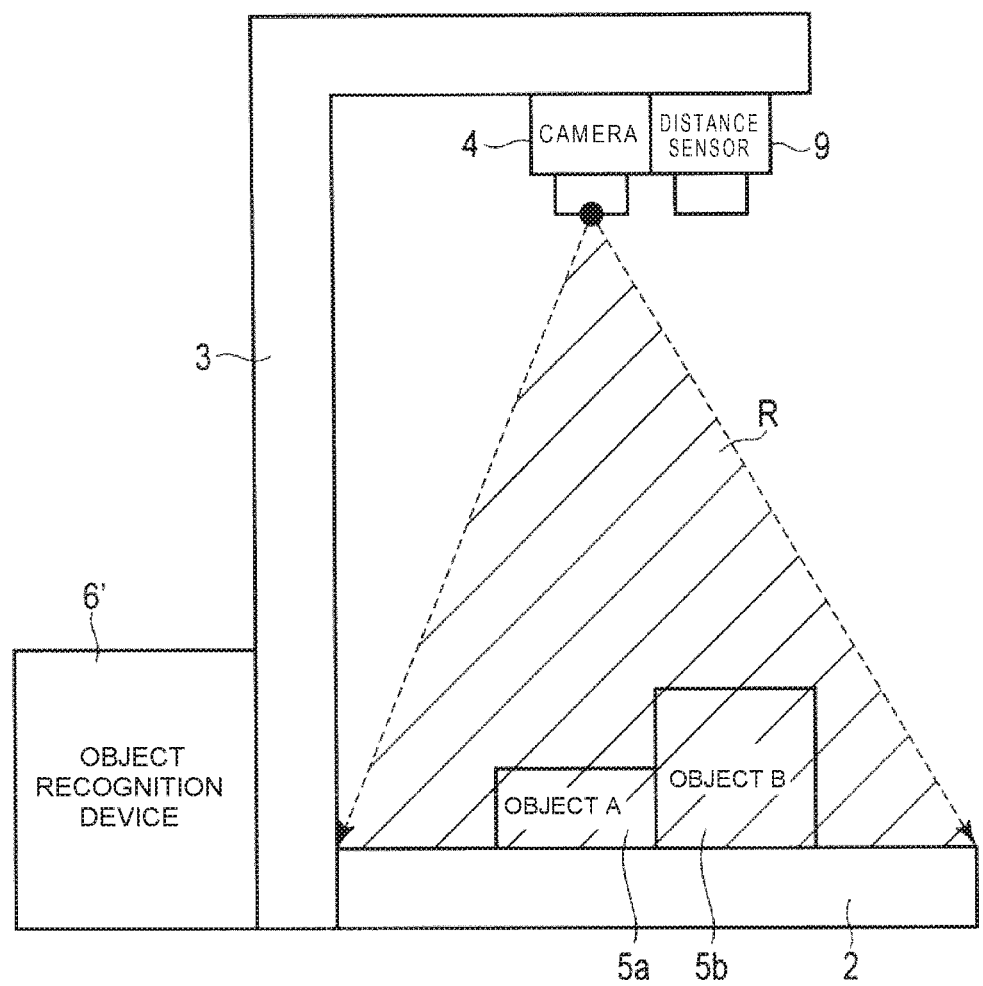
FIG. 7 is a schematic view illustrating an example configuration of an object recognition system that includes an object recognition device according to a second embodiment.
Figure 8:
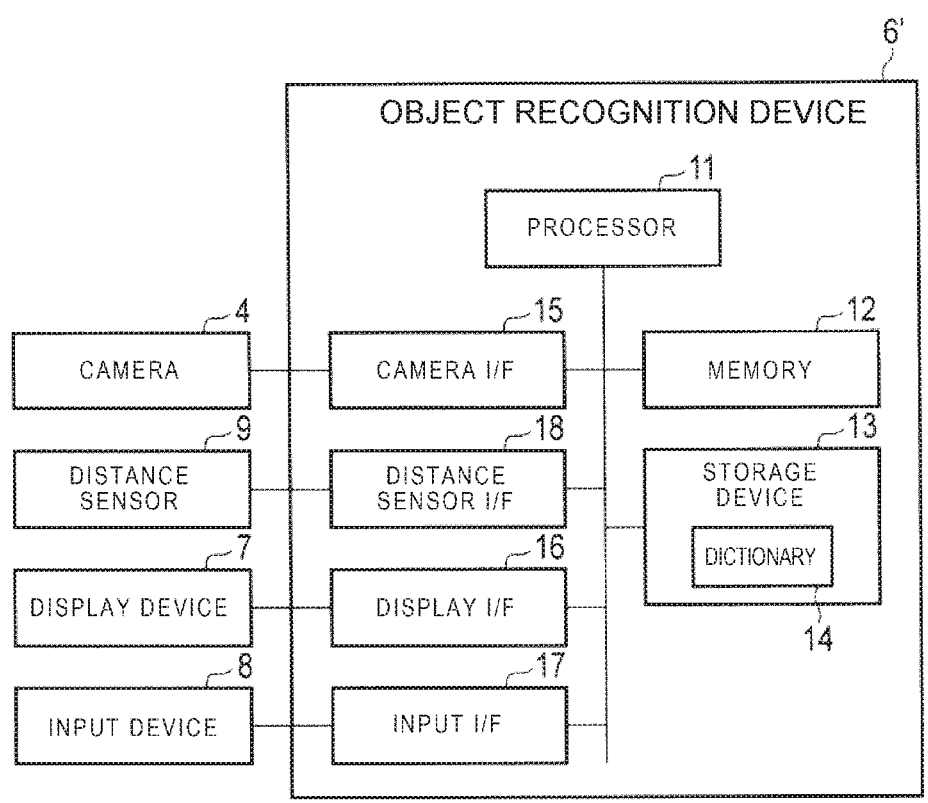
FIG. 8 is a block diagram illustrating an example configuration of the object recognition device.

FIG. 7 is a schematic view illustrating an example configuration of the object recognition system 1' that includes the object recognition device 6' according to the second embodiment. In addition, FIG. 8 is a block diagram illustrating an example configuration of the object recognition device 6' according to the second embodiment.

As illustrated in FIG. 7, the object recognition system 1' includes the table 2, the frame 3, the camera 4, the object recognition device 6', and a distance sensor 9. The object recognition system 1' is a system in which the object recognition device 6' recognizes individual objects included in an image that is captured by the camera 4. In addition, as illustrated in FIG. 8, the object recognition system 1' includes the display device 7 and the input device 8 that are connected to the object recognition device 6'. For example, the object recognition system 1' may include a settlement device as with the first embodiment, and may also include a counting device or an inspection device.

Since the table 2, the frame 3, the camera 4, the display device 7, and the input device 8 can be realized in the same manner as those in FIGS. 1 and 2 described in the first embodiment, detailed description thereof will be omitted.

The distance sensor 9 is a sensor that obtains distance information that indicates a distance between a reference point and a target object. The distance sensor 9 obtains distance data (the distance information) such as a range image. The distance sensor 9 may have any configuration as long as the distance sensor 9 obtains distance data with respect to a surface of the table 2 on which an object is disposed. The distance sensor 9 is, for example, a 3D camera that captures a range image as distance data. In addition, the distance sensor 9 may be an ultrasonic sensor that measures distance data. As the distance sensor 9 capturing a range image, any of a stereo image type sensor, a patterned light irradiation type sensor, and a time-of-flight (TOF) type sensor may be provided.

Here, the description will be made on an assumption that the distance sensor 9 is a 3D camera that captures a range image. The 3D camera as the distance sensor 9 includes an imaging element and a lens through which light from a range wider than the angle of view of the camera 4 is focused on the imaging element. The 3D camera, functioning as the distance sensor 9, is attached to the frame 3 such that the imaging optical axis of the lens faces the table 2. According to this configuration, the distance sensor 9 obtains a range image that indicates a distance to the target object on the table 2.

Note that, the camera 4 and the distance sensor 9 may be integrally formed with each other. For example, the camera 4 and the distance sensor 9 may share the lens. Likewise, the camera 4 and the distance sensor 9 may share the lens and the imaging element.

The object recognition device 6' according to the second embodiment performs the object recognition process with respect to a captured image that is captured by the camera 4 by using the range image obtained by the distance sensor 9. The object recognition device 6' is an information processing device programmed to perform an object recognition process, which will be described later. In the example illustrated in FIG. 8, the object recognition device 6' includes the processor 11, the memory 12, the storage device 13, the camera I/F 15, the display I/F 16, the input I/F 17, and a distance sensor I/F 18. The processor 11, the memory 12, the storage device 13, the camera I/F 15, the display I/F 16, the input I/F 17, and the distance sensor I/F 18 are connected to each other via a bus such that the processor 11, the memory 12, the storage device 13, the camera I/F 15, the display I/F 16, the input I/F 17 and the distance sensor I/F 18 can communicate with each other. Since the physical configurations of the processor 11, the memory 12, the storage device 13, the camera I/F 15, the display I/F 16, and the input I/F 17 can be realized in the same manner as those described in the first embodiment, detailed description thereof will be omitted.

The processor 11 of the object recognition device 6' according to the second embodiment executes various programs to function as a height extracting unit, an area extracting unit, and the like in addition to the various processing functions described in the first embodiment. The height extracting unit has a function of identifying the height of an object from the range image. The area extracting unit has a function of extracting an object candidate area in the captured image based on the range image.

The distance sensor interface (I/F) 18 is configured to provide communication with the distance sensor 9 and the processor 11. The distance sensor I/F 18 provides data input and output between the processor 11 and the distance sensor 9. For example, the distance sensor 9 supplies a captured range image to the processor 11 via the distance sensor I/F 18.

Next, the dictionary registration process in the object recognition device 6' according to the second embodiment in which dictionary information is registered in the dictionary 14 will be described.

Figure 9:
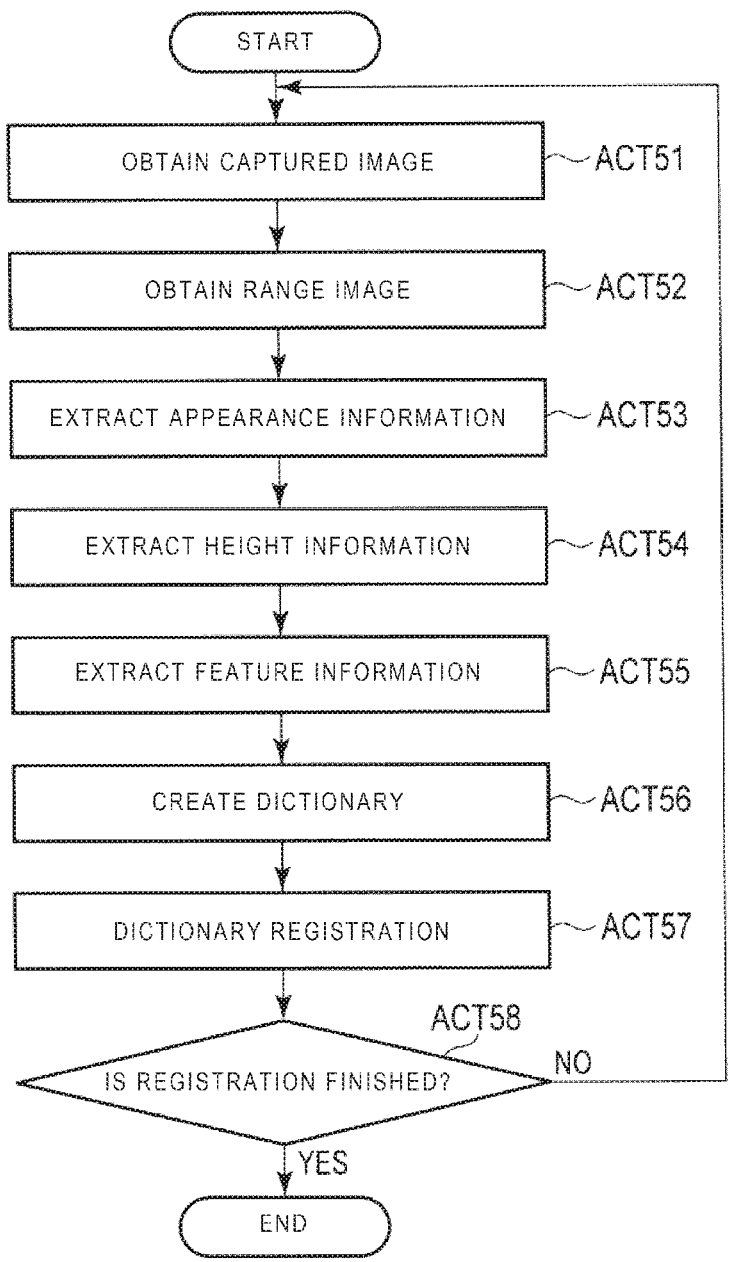
FIG. 9 is a flowchart illustrating an example sequence of operations for a dictionary registration process according to the second embodiment.

FIG. 9 is a flowchart illustrating an example sequence of operations for the dictionary registration process that is performed by the object recognition device 6' according to the second embodiment.

An operator issues an instruction to set a dictionary registration mode as an operation mode by using the input device 8. Furthermore, the operator places a single object to be registered within the object position area on the table 2 and issues an instruction to start the dictionary registration process. When the instruction to start the dictionary registration process is issued, the processor 11 instructs the camera 4 to capture an image and instructs the distance sensor 9 to capture a range image. The camera 4 captures an image of the imaging area including the object position area on the table 2 based on the instruction from the object recognition device 6' and supplies the captured image to the object recognition device 6'. In addition, distance sensor 9 captures a range image of an area including the object position area on the table 2 based on the instruction from the object recognition device 6' and supplies the captured range image to the object recognition device 6'.

After the camera 4 is instructed to capture an image, the object recognition device 6' obtains the captured image from the camera 4 by using the camera I/F 15 (ACT 51). In addition, after the distance sensor 9 is instructed to capture a range image, the object recognition device 6' obtains the range image from the distance sensor 9 by using the distance sensor I/F 18 (ACT 52).

When the captured image and the range image are obtained, the processor 11 extracts boundary information, for identifying the boundary of the object, from the range image (ACT 53). The boundary information is information for estimating the entire image area (boundary) of the object as with the first embodiment. In addition, the height of the object is specified by using the range image in the image area (boundary) of the object (ACT 54). For example, the processor 11 calculates the height of the object by using a difference between a predetermined distance from the distance sensor 9 to a surface of the table 2 on which the object is placed and the range image.

When the captured image from the camera 4 is obtained, the processor 11 identifies a merchandise area in the captured image by using the boundary information obtained from the range image and extracts feature information for identifying the object by using pixel information of the merchandise area in the captured image (ACT 55). The feature information is matching information for recognizing (identifying) the object as with the first embodiment.

When the height, the feature information, and the boundary information are obtained, the processor 11 creates dictionary information in which the obtained height, the feature information, and the boundary information of the object are correlated with information indicating the type of the object or the like (ACT 56). The created dictionary information is information for recognition with respect to a surface of a registration target object that is imaged by the camera 4. The processor 11 registers the created dictionary information in the dictionary 14 (ACT 57).

Processes in ACT 51 to ACT 57 are performed for each surface of an object to be registered. That is, when the registration of the dictionary information in ACT 56 is finished, the processor 11 determines whether to finish the dictionary registration processor not (ACT 58). For example, the object recognition device 6' may determine whether to finish or continue the dictionary registration according to an instruction to finish the registration or an instruction to perform the dictionary registration with respect to another surface from the operator. If there is an instruction to start registration of another surface that is issued through the input device 8 (NO in ACT 58), the processor 11 returns to ACT 51 and the processor 11 performs the processes in ACT 51 to ACT 57 again. In this case, the operator may issue an instruction to restart the dictionary registration after changing a surface of the object that faces the camera 4. In addition, if there is an instruction to finish the registration that is issued through the input device 8 (YES in ACT 58), the processor 11 finishes the dictionary registration process.

Via the above-described processes, information for identifying an object—including the height information in addition to the feature information and the boundary information—is registered in the dictionary 14 of the object recognition device 6' according to the second embodiment.

Next, the object recognition process in the object recognition device 6' according to the second embodiment will be described.

Figure 10:
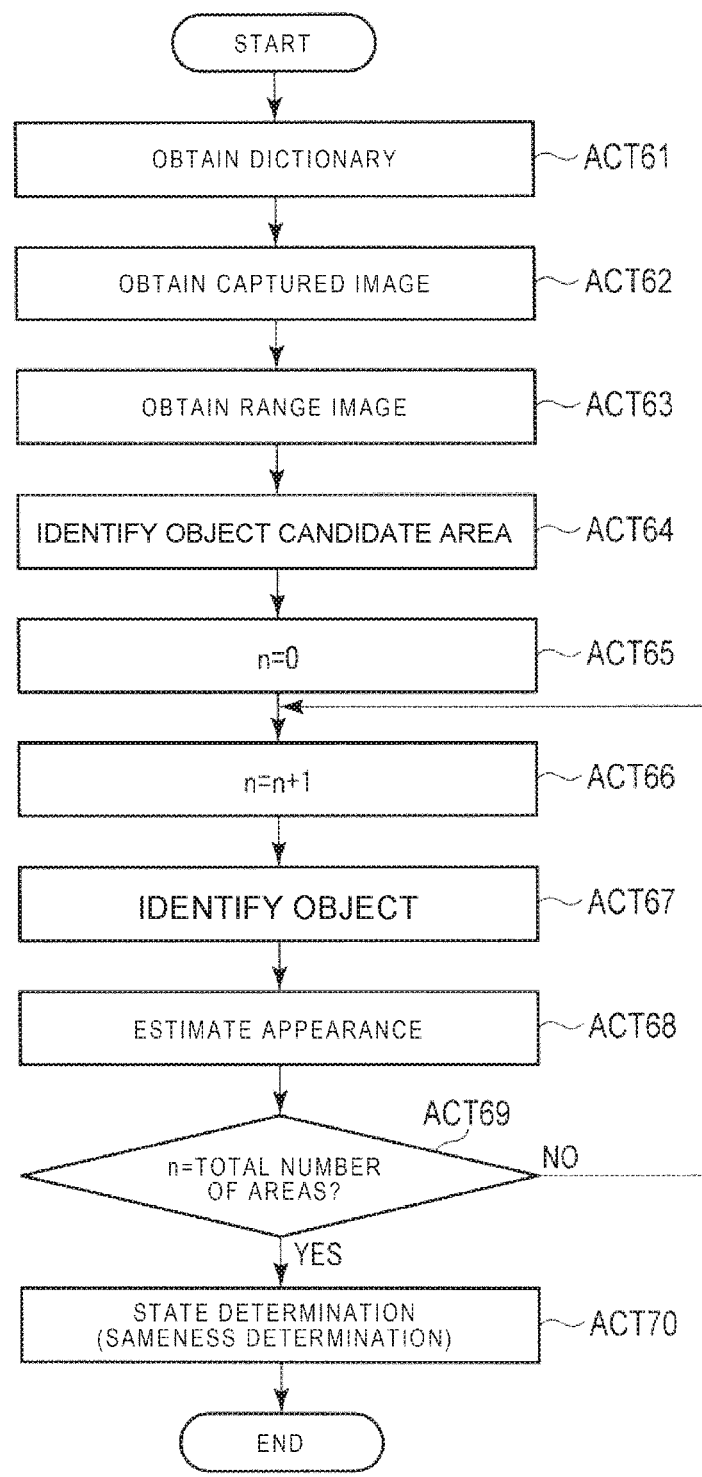
FIG. 10 is a flowchart illustrating an example sequence of operations for an object recognition process according to the second embodiment.
Figure 11:
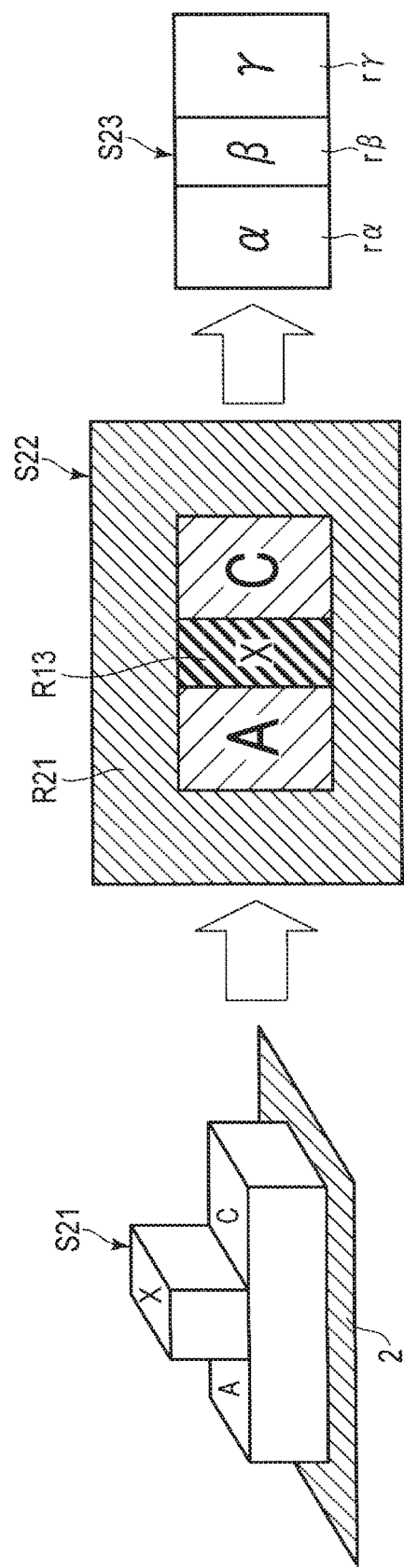
FIG. 11 is a diagram illustrating an example of an arrangement of objects to be recognized, an example of a captured image, and an example of an object area.
Figure 12:
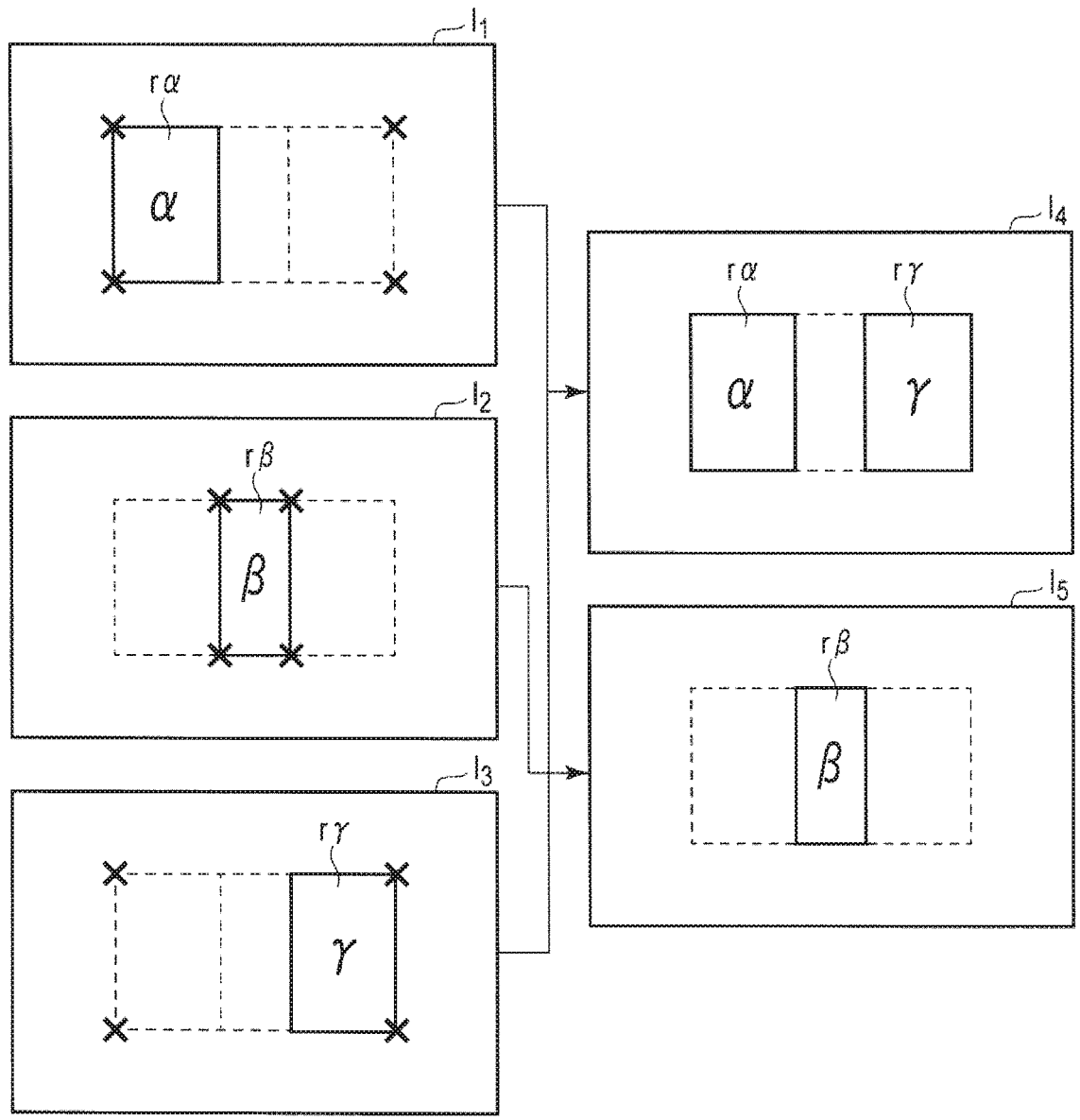
FIG. 12 is a diagram illustrating a sameness determination process.

FIG. 10 is a flowchart illustrating an example sequence of operations for the object recognition process performed by the object recognition device 6' according to the second embodiment. In addition, FIG. 11 is a diagram illustrating an example of an arrangement state S21 of a plurality of objects, an example of a captured image S22, and an example of an object image area S23. In addition, FIG. 12 is a diagram illustrating an example of a sameness determination process with respect to the object image area illustrated in FIG. 11.

The operator issues an instruction to set a recognition process mode as the operation mode by using the input device 8 and places objects to be recognized within the object position area on the table 2. Here, the description will be made assuming that a plurality of objects is placed within the object position area on the table 2.

After placing the objects, the operator issues an instruction to start the object recognition process by using the input device 8. Alternatively, the object recognition process may be started when it is detected that the objects are placed. When the instruction to start the object recognition process is issued, the processor 11 instructs the camera 4 to capture an image and instructs the distance sensor 9 to capture a range image. The camera 4 captures an image of the imaging area including an object position area according to the instruction from the object recognition device 6'. The camera 4 supplies the captured image to the object recognition device 6'. In addition, the distance sensor 9 captures a range image of the imaging area including the object position area according to the instruction from the object recognition device 6'. The distance sensor 9 supplies the captured range image to the object recognition device 6'.

When the object recognition process is started, the processor 11 accesses the dictionary 14 (ACT 61) and receives the captured image from the camera 4 and the range image from the distance sensor 9. When the camera 4 outputs the captured image, the processor 11 of the object recognition device 6' obtains the captured image from the camera 4 via the camera I/F 15 (ACT 62). In addition, when the distance sensor 9 outputs the range image, the processor 11 of the object recognition device 6' obtains the range image from the distance sensor 9 via the distance sensor I/F 18 (ACT 63).

When the captured image and the range image are obtained, the processor 11 identifies areas that are candidates of individual objects (the object candidate areas) in the captured image by using the range image (ACT 64). For example, the processor 11 identifies the object candidate areas by grouping (labeling) pixels with similar distances in the captured image. In addition, the processor 11 may identify the object candidate areas by a method other than a distance-based grouping method. Here, since plural objects are recognition targets, a plurality of (for example, n) object candidate areas are identified.

For example, when an object X and an object ABC in the arrangement state S21 as illustrated in FIG. 11 are imaged, the captured image S22 as illustrated in FIG. 11 is obtained. A hatched portion of the captured image S22 illustrated in FIG. 11 is a background area R21 and a portion other than the background area R21 is a foreground area, i.e., the object image area R13. As the object image area S23, three areas (the object candidate areas) "rα," "rβ," and "rγ" are identified through a distance-based grouping method. The area "rβ" is an image area of the object X. Each of the areas "rα" and "rγ" is a portion of an image of the object ABC. The areas "rα" and "rγ" are separated from each other by an image of the object X.

Note that, the object image area S23 can be obtained through the above-described background difference method. In addition, the object image area S23 may be obtained by using a range image. Since the objects are present within the foreground area, a distance to the foreground area is different from a distance to the background area. Accordingly, an area with a distance different from that of the background area is obtained as the object image area S23. In the second embodiment, a single, unified object image area S23 may not be identified since candidate areas of individual objects are specified from the range image.

When the plurality of object candidate areas are extracted, the processor 11 identifies an object and estimates the boundary with respect to each object candidate area (ACT 65 to ACT 69). That is, when the plurality of object candidate areas are extracted, the processor 11 initializes a variable n (n=0) (ACT 65). After the variable n is initialized, the processor 11 increments the variable n (n=n+1) (ACT 66). When the variable is incremented, the processor 11 performs the object identifying process of identifying an object with respect to the nth object candidate area (ACT 67). For example, the processor 11 sequentially processes the three areas "rα," "rβ," and "rγ" illustrated in FIG. 11. The area "rα" is a portion of the image corresponding to the object ABC. For this reason, if the area "rα" is a processing target, the processor 11 identifies the object ABC by using feature information obtained from the area "rα". In addition, if the area "rβ" is a processing target, the processor 11 identifies the object X by using feature information obtained from the area "rβ." If the area "rγ" is a processing target, the processor 11 identifies the object ABC by using feature information obtained from the area "rγ."

When an object in the nth object candidate area is specified, the processor 11 extracts at least a portion of boundary information such as end points from the object candidate area. The processor 11 identifies an estimated object area by estimating the boundary of the object by using boundary information (dictionary information) in the dictionary 14 corresponding to the identified object and boundary information extracted from the object candidate area (ACT 68). The estimated object area is an area estimated as a boundary area of the entire object. If an image of the entire object (the entire boundary) is included in the object candidate area, the estimated object area coincides with the object candidate area. On the other hand, if an image of the entire object is not included in the object candidate area (e.g., if a portion of the object is hidden by another object), the estimated object area does not coincide with the object candidate area. In this case, the object candidate area is an image of a portion of the object and the estimated object area is an area including the object candidate area.

For example, the area "rα" illustrated in FIG. 11 is identified as the object ABC by using feature information such as a local feature value. With respect to the area "rα" specified as the object ABC, end points (the boundary) of the object ABC are estimated as illustrated in an image I1 in FIG. 12 and the estimated object area thereof is specified by using the end points. In addition, with respect to the area "rβ" identified as the object X, end points (the boundary) of the object X are estimated as illustrated in an image I2 in FIG. 12 and the estimated object area thereof is identified by using the end points. In addition, with respect to the area "rγ" identified as the object ABC, end points (the boundary) of the object ABC are estimated as illustrated in an image I3 in FIG. 12 and the estimated object area thereof is specified by using the end points.

When the estimated object area for an object is identified, the processor 11 determines whether the variable n is equal to the total number of object candidate areas (for example, N) (ACT 69). This determines whether object identification and the boundary estimation are performed with respect to every object candidate area. If the variable n is not equal to the total number of object candidate areas, that is, if there is an object candidate area for which object identification and the boundary estimation are not performed (NO in ACT 69), the processor 11 returns to ACT 66. After returning to ACT 66, the processor 11 increments the variable n and performs object identification and boundary estimation for the next object candidate area.

In addition, if the variable n is equal to the total number of object candidate areas, that is, if the object identification and the boundary estimation are performed with respect to every object candidate area (YES in ACT 69), the processor 11 performs the state determination process (ACT 70). The state determination process may be a process of determining the overlapped state of each object as described in the first embodiment and may be the sameness determination process of identifying the same object. Here, an operation example pertaining to a case where the sameness determination process is performed as the state determination process will be described. The processor 11 performs the sameness determination process of determining whether estimated object areas of the same types of objects out of objects identified from respective object candidate areas coincide with each other to determine whether the estimated object areas are actually areas of the same object.

For example, the estimated object area of the object X identified from the area "rβ" illustrated in the image I3 in FIG. 12 coincides with the boundary of the object X that is obtained from the boundary information registered in the dictionary 14. Therefore, it is possible to identify the area "rβ" as an image of the entire portion of one object X as illustrated in an image I5 in FIG. 12. With regard to this, the estimated object area of the object ABC that is identified from the area "rα" illustrated in the image I1 in FIG. 12 coincides with the estimated object area of the object ABC that is identified from the area "rγ" illustrated in the image I3 in FIG. 12. Therefore, it is possible to identify each of the areas "rα" and "rγ" as an image of a portion of one object ABC (i.e. the same object) as illustrated in an image I4 in FIG. 12. That is, regarding two areas specified as the same type of object, it is possible to determine whether the two areas are one object or two objects (to perform sameness determination) by comparing the estimated object areas thereof.

In addition, the processor 11 may perform the sameness determination based on height obtained from the range image with respect to a plurality of object candidate areas determined as the same types of objects. For example, the processor 11 determines whether heights obtained from the range image that are correlated with the two areas "rα" and "rγ" illustrated in FIG. 11 are almost the same. If it is determined that the heights of the two areas "rα" and "rγ" are almost the same, the processor 11 determines that the object ABC of the area "rα" and the object ABC of the area "rγ" are the same. Furthermore, the processor 11 may perform the sameness determination while combining the above-described estimated object area comparison and the height comparison using the range image.

When the above-described state determination is finished, the processor 11 finishes the object recognition process while using the result of the process of identifying the objects and the result of the state determination process for each of the specified objects as the result of the object recognition process.

The object recognition device according to the above-described second embodiment identifies a plurality of objects in the captured image by using the captured image and the range image and determines the state of each of the identified objects. Since the object recognition device according to the second embodiment determines the state of each of the specified objects, it is possible to accurately recognize individual objects even if a plurality of objects to be recognized are present in the captured image.

In addition, the object recognition device according to the second embodiment determines whether objects specified as the same type of object from two areas are the same object (a single object) or two objects, as the state of each object. Therefore, according to the second embodiment, it is possible to prevent one object from being recognized as a plurality of objects, depending on the disposition state of a plurality of objects and to accurately recognize individual objects.

Furthermore, the object recognition device according to the second embodiment specifies the object candidate areas by using the range image and determines whether two objects specified as the same type of object are the same object by using the range image. Therefore, according to the second embodiment, it is possible to accurately recognize individual objects by using the range image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications thereof as would fall within the scope and spirit of the inventions.

What is claimed is:

1. An object recognition device comprising:
a camera configured to capture an image of an imaging area including an object position area;
a storage device that stores, for each of a plurality of registered objects, dictionary feature information for identifying the corresponding object and dictionary boundary information for identifying an actual boundary area of the corresponding object; and
a processor configured to:
receive the captured image from the camera,
determine an object area in the captured image,
extract feature information from the object area,
based on the extracted feature information compared to the dictionary feature information, identify each object included in the object area,
extract boundary information corresponding to each identified object included in the object area,
based on the extracted boundary information compared to the dictionary boundary information with respect to each identified object, determine an overlap state of each identified object relative to additional objects in the object area,
based on the determined overlap state of each identified object, determine whether two or more identified objects in the object area are portions of the same object, and
perform a settlement processing for a transaction with respect to each identified object, wherein two or more identified objects that are determined to be portions of the same object are treated as a single identified object in the transaction.

2. The device according to claim 1, the processor being further configured to:
determine a distance between a reference point and a target object in the imaging area, the object area being determined based on the determined distance.

3. The device according to claim 2, wherein the processor determines a plurality of object areas based on the determined distance.

4. The device according to claim 3, wherein the processor identifies a number of objects equal to the number of determined object areas.

5. The device according to claim 3, the processor being further configured to:
determine whether two or more identified objects are the same type of object, wherein the determination of whether two or more identified objects in the object area are portions of the same object is further based on whether the two or more identified objects are the same type of object.

6. The device according to claim 2, further comprising:
a distance sensor configured to generate a range image indicating a distance from the reference point to each object included in the object position area, wherein the processor receives the range image and determines the distance between the reference point and the target object based on the range image.

7. The device according to claim 6, wherein the distance sensor includes a lens that is shared with the camera.

8. The device according to claim 1, wherein the dictionary boundary information is information indicating at least a portion of a contour of the corresponding object.

9. The device according to claim 8, wherein the dictionary boundary information further indicates, with respect to each registered object, a positional dependence relationship with respect to the dictionary feature information and the contour.

10. The device according to claim 9, wherein the processor identifies each object included in the object area further based on the positional dependence relationship.

11. An object recognition method comprising the steps of:
storing, for each of a plurality of registered objects, dictionary feature information for identifying the corresponding object and dictionary boundary information for identifying an actual boundary area of the corresponding object;
capturing an image of an imaging area including an object position area;
determining an object area in the captured image;
extracting feature information from the object area;
based on the extracted feature information compared to the dictionary feature information, identifying each object included in the object area;
extracting boundary information corresponding to each identified object included in the object area;
based on the extracted boundary information compared to the dictionary boundary information with respect to each identified object, determining an overlap state of each identified object relative to additional objects in the object area;
based on the determined overlap state of each identified object, determining whether two or more identified objects in the object area are portions of the same object; and
performing a settlement processing for a transaction with respect to each identified object, wherein two or more identified objects that are determined to be portions of the same object are treated as a single identified object in the transaction.

12. The method according to claim 11, further comprising the step of:
determining a distance between a reference point and a target object in the imaging area, the object area being determined based on the determined distance.

13. The method according to claim 12, wherein a plurality of object areas are each determined based on the determined distance.

14. The method according to claim 13, wherein a number of identified objects is equal to the number of determined object areas.

15. The method according to claim 13, further comprising the step of:
determining whether two or more identified objects are the same type of object, wherein the determination of whether two or more identified objects in the object area are portions of the same object is further based on whether the two or more identified objects are the same type of object.

16. The method according to claim 12, further comprising:
generating a range image indicating a distance from the reference point to each object included in the object position area, wherein the distance between the reference point and the target object is determined based on the range image.

17. The method according to claim 16, wherein:
a distance sensor generates the range image,
a camera generates the image of the imaging area, and
the distance sensor and the camera share a lens.

18. The method according to claim 11, wherein the dictionary boundary information is information indicating at least a portion of a contour of the corresponding object.

19. The method according to claim 18, wherein the dictionary boundary information further indicates, with respect to each registered object, a positional dependence relationship with respect to the dictionary feature information and the contour.

20. The method according to claim 19, wherein each object included in the object area is identified further based on the positional dependence relationship.

* * * * *